(No Model.)
A. P. YATES.
VEHICLE RUNNER.
No. 341,304. Patented May 4, 1886.
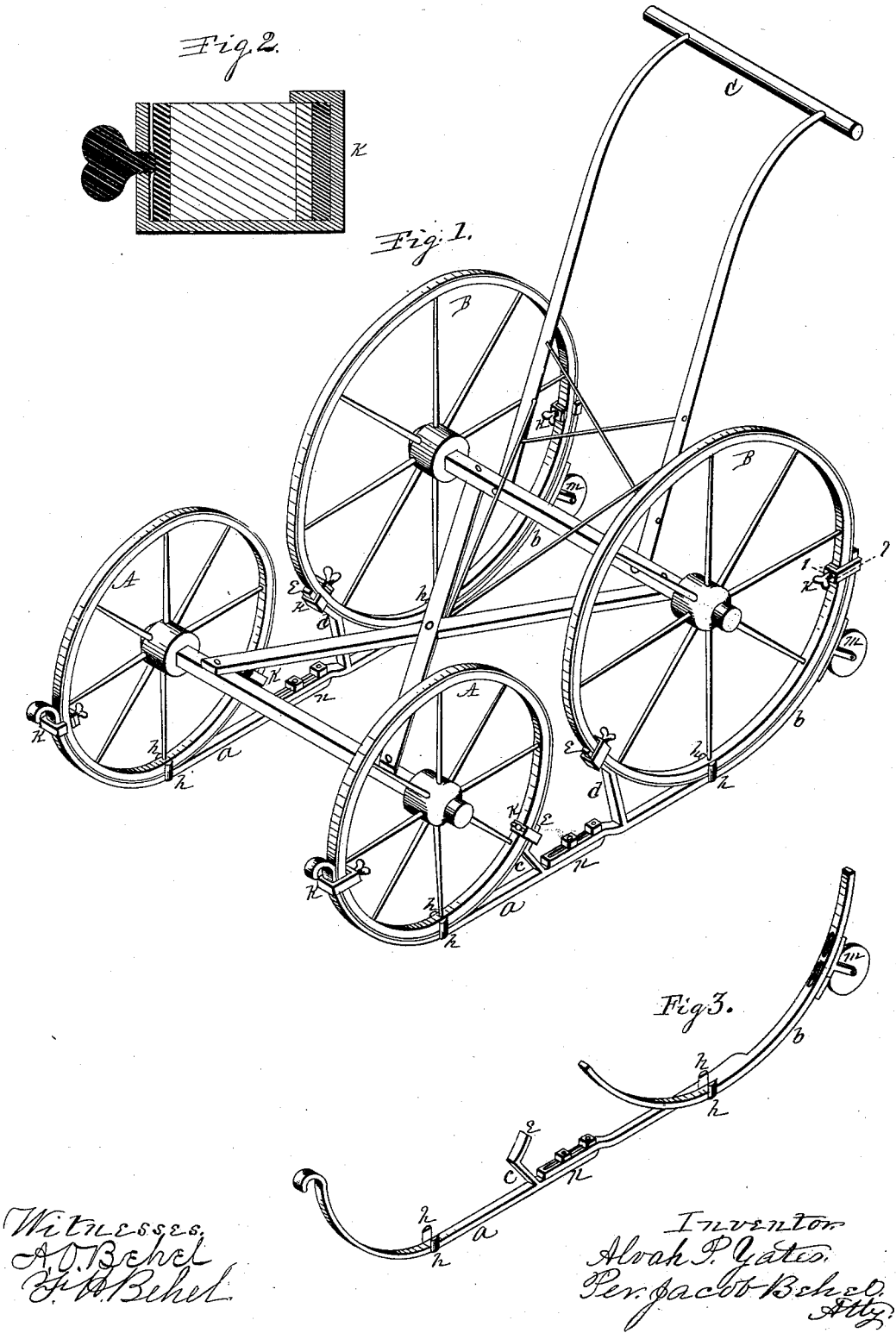

UNITED STATES PATENT OFFICE.

ALVAH P. YATES, OF ROCKFORD, ILLINOIS.

VEHICLE-RUNNER.

SPECIFICATION forming part of Letters Patent No. 341,304, dated May 4, 1886.

Application filed September 8, 1885. Serial No. 176,518. (No model.)

*To all whom it may concern:*

Be it known that I, ALVAH P. YATES, a citizen of the United States, residing in the city of Rockford, in the county of Winnebago and State of Illinois, have invented a new and useful Improvement in Vehicle-Runners, of which the following is a specification.

This invention relates to runners for wheeled vehicles. Its object is to provide a runner capable of use in connection with the wheels of a vehicle to fit it for use as a sleigh; and it consists, essentially, in a runner formed to receive the wheels of the vehicle and means to connect it therewith, all of which, in connection with its construction and application, are represented in the accompanying drawings, and will be hereinafter more fully described.

In the drawings, Figure 1 is an isometrical representation of the running-gear of a wheeled vehicle with my improvements in place thereon, and in which the wheels, in pairs, are arranged to track. Fig. 2 is a sectional representation on dotted line 1 on Fig. 1, and Fig. 3 is an isometrical representation of a runner designed for a vehicle in which the wheels are out of line or do not track.

The wheeled portion of a vehicle represented in the figures is one form of the running-gear of what is known in the trade as the "baby-cab," of the variety in which the carrying-wheels, consisting of the forward wheels, A, and the rear wheels, B, in pairs on the respective sides of the gear, are placed in the same lengthwise vertical plane to track in the same line.

In connection with the running-gear represented in the drawings, as above described, I have represented my improvements, and in which the forward portion, a, of the runner is curved upward to embrace the forward under portion of the forward wheel, from which it extends rearward and under the rear wheel, and its rear portion, b, is curved upward to embrace the rear under portion of the rear wheel. A brace, c, rises from the runner rearward of the front wheel to engage its rear under portion, and a like brace, d, rises from the runner forward of the rear wheel to engage its forward under portion, and these braces at their upper ends are formed with an arm, e, to engage the curved surface of the wheel, and, in connection with the outer end curved portions of the runner, form seats or footings to receive their respective wheels. These runners are also provided with upward-projecting lips h, to embrace the rim of the wheel on opposite sides to prevent displacement.

Screw-clamps k, produced in rectangular form, of suitable dimensions, and with an open side to be passed onto and embrace the runner and the rim of the wheel, are put in place on the end portions of the runner and on the upper end portion of the braces, and by means of the clamping-screw are fixed in place and hold the runner fixed to the wheels to fit it for use as a sleigh.

In the use of a baby-cab on runners as a sleigh on snow or iced roads, bare spots, or spots without snow or ice, will be met with, on which the runners would move with difficulty. To provide for such contingencies I have provided my improved runners with a carrying-wheel, m, placed on the runner on its rear upward curving portion a suitable distance above the tread of the runner, but in such relation thereto that a downward pressure on the handle C of the cab to elevate its front portion will bring the wheel in contact with the track or roadway and relieve the runners from contact to carry the cab on the wheels over the difficult going. The wheel m is made adjustable in its connection with the runner by means of a series of screw holes or slots formed in the runner or in the wheel-support, or in both the runner and support, to receive the screws or screw-bolts employed to fix it in place, and is also made attachable by means of its screw connection with the runner, and the runners are capable of use with or without the wheel.

The distance between the axle-trees in cabs of various manufacturers are not always uniform, and require runners of various lengths, and runners may be manufactured to meet these differences; but in this instance I have constructed the runners in sections, made adjustable lengthwise by means of their overlapping central portions, n, having a slotted and screw-clamp connection capable of lengthwise adjustment to adapt them to cabs of various lengths.

Cabs are manufactured and are in use and to be found in the trade in which the rear axle-tree is longer than the forward axle-tree, and consequently the rear wheels tread outside of the track of the forward wheels. To adapt my improved runner to this variety of cab I have produced the construction represented in Fig. 3, in which the runners are out of line or are in different lengthwise parallel planes to correspond with the planes of the wheels, which is accomplished by joining the inner edge of the runner to the rear wheel to the outer edge of the runner to the forward wheel. In this form of the runner I prefer to omit the brace $d$ to the rear wheel, and instead thereof to cause the forward portion of the runner to engage the forward portion of the rear wheel. In this construction of the runner the lengthwise adjustment may be made by a side extension of the runner to the rear wheel to overlap the rear end of the runner to the forward wheel, and made adjustable lengthwise in its connection therewith, substantially in the same manner as the adjustable connection of the runners hereinbefore described, and for the same purpose.

In the foregoing I have described my improved runner in connection with the running-gear of a baby-cab, but do not wish to confine myself to this particular application, as it is capable of use in connection with other forms of four-wheeled vehicles, and desire protection by patent in applications in which it may be found useful other than those herein described.

I claim as my invention—

1. A runner formed to embrace the under portions of the wheels, and consisting of two lengthwise-adjustable sections provided with curved braces and securing-clamps, substantially as described.

2. The combination, with the forward section of the runner, of a rear section adjustably secured to said forward section and provided with a side extension to permit the use of the runner with vehicles whose wheels are out of line, substantially as described.

3. The combination, with the runner, of a carrying-wheel fixed to the runner, substantially as and for the purpose set forth.

4. The carrying-wheel made adjustable in its connection with the runner, substantially as and for the purpose set forth.

ALVAH P. YATES.

Witnesses:
JACOB BEHEL,
A. O. BEHEL.